United States Patent [19]

Dearman

[11] 3,851,401
[45] Dec. 3, 1974

[54] FLANGED PIPE ALIGNING TOOL

[76] Inventor: Timothy C. Dearman, 4191 E. Stanley Rd., Mt. Morris, Mich. 48458

[22] Filed: Aug. 25, 1971

[21] Appl. No.: 174,857

[52] U.S. Cl. .................................. 33/371, 33/158
[51] Int. Cl. ............................................. G01c 9/24
[58] Field of Search .............. 33/370, 371, 158, 333

[56] References Cited
UNITED STATES PATENTS

| | | | |
|---|---|---|---|
| 2,323,039 | 6/1943 | Hill | 33/371 X |
| 2,358,564 | 9/1944 | Donaldson | 33/370 X |
| 2,668,359 | 2/1954 | Litchfield | 33/158 X |
| 2,746,163 | 5/1956 | Moritz | 33/370 |
| 3,296,708 | 1/1967 | Moody | 33/371 |

Primary Examiner—William D. Martin, Jr.
Attorney, Agent, or Firm—Learman & McCulloch

[57] ABSTRACT

A tool for aligning flanged pipes having openings in the flanges comprises a body having a pair of probes each of which terminates in a finger of such size as to be accommodated in an opening in the flange, the probes being slideable longitudinally of the body so as to be usable with pipe flanges of greatly differing diameter. The probes are equipped with cantilever springs which aid in maintaining the fingers in proper position in the flange openings regardless of the size of the latter. The probes are rotatable relatively to the body from a first position in which they extend substantially normal to the body to a second position in which they substantially parallel the body, and the probes include guides which maintain the arms in a selected one of such positions.

11 Claims, 5 Drawing Figures

PATENTED DEC 3 1974 3,851,401
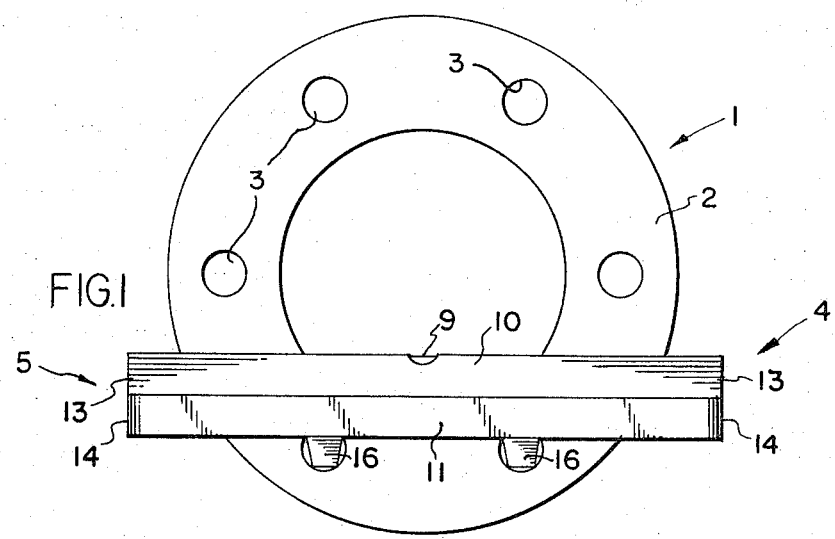
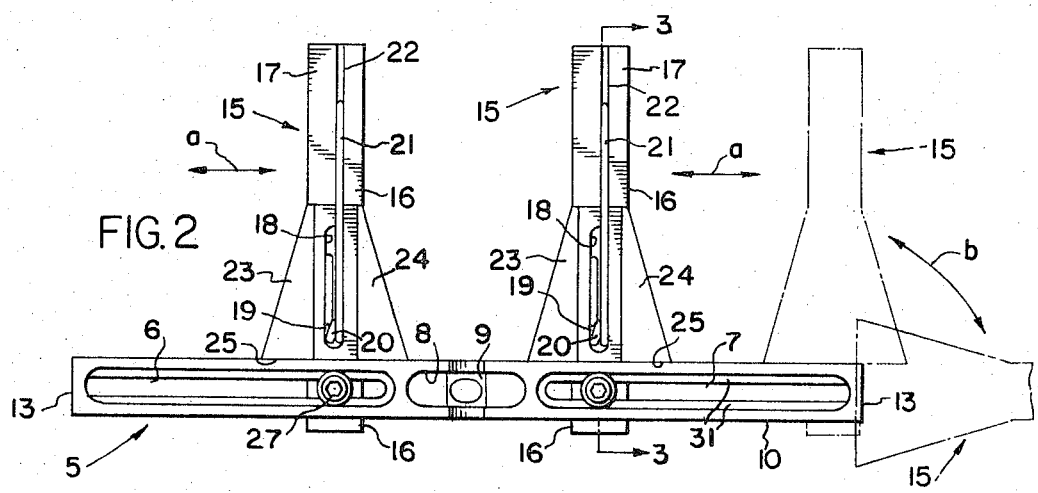
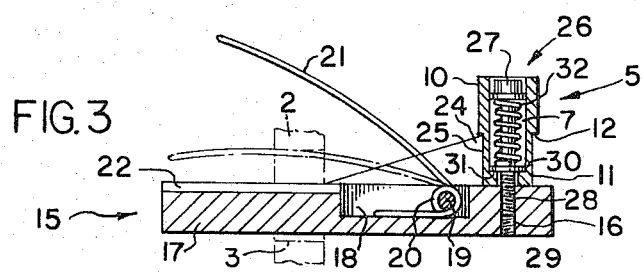
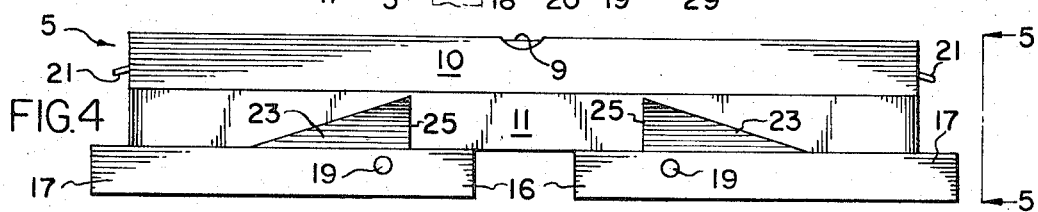
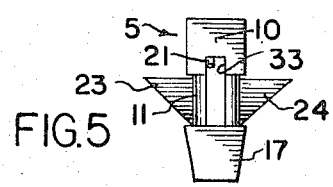
INVENTOR
TIMOTHY C. DEARMAN
BY
Learman & McCulloch
ATTORNEYS

FLANGED PIPE ALIGNING TOOL

The invention disclosed herein relates to a tool which is adapted for use by pipe fitters and welders and more particularly to a tool which facilitates the aligning of a flanged pipe length or fitting with other pipe lengths or fittings in such manner that the bolt-accommodating openings in the flanges are axially aligned.

Flanged pipe lengths and fittings conventionally have openings in their flanges for the accommodation of bolts or the like by means of which a plurality of pipe lengths may be joined one to the other and by means of which elbow and other fittings may be joined to one or more pipe lengths. When joining such pipe lengths and fittings to one another it is necessary that the openings in the flanges of adjacent pipe lengths be in axial alignment with one another. Such alignment conventionally is accomplished by the use of a tool having a pair of fingers or probes which may be fitted into a pair of holes in the flange and the pipe or fitting adjusted until the two holes are coplanar as may be determined by a spirit level carried by the tool. Aligning tools of this general kind are quite common, but not all of the aligning tools currently in use are altogether satisfactory for a number of reasons. For example, not all of the conventional aligning tools assure uniform seating of the probes in the flanged holes, thereby making it difficult to assure coaxial alignment of the flanges of successive pipe lengths or fittings. Moreover, conventional aligning tools include multiple parts which must be assembled before use and disassembled after use or, alternatively, are composed of parts which permanently are assembled, thereby creating an awkward storage and transportation problem. In those instances in which the parts of the aligning tool permanently are assembled, the probes constantly are located in a position in which they may be damaged unless considerable care is exercised.

An object of this invention is to provide an aligning tool which overcomes the disadvantages of previously known tools for similar purposes.

Another object of this invention is to provide an aligning tool having probes which are permanently assembled with a supporting body, but which may be moved from operative, probing condition to a nested, retracted position in which they are protected against damage.

A further object of the invention is to provide a tool of the character described which is capable of use in aligning pipes and fittings of greatly differing diameters.

Another object of the invention is to provide a pipe aligning tool provided with probes capable of being accommodated in bolt-receiving openings of greatly differing size, but which nevertheless may be seated in such openings in a uniform manner.

Other objects and advantages of the invention will be pointed out specifically or will become apparent from the following description when it is considered in conjunction with the appended claims and the accompanying drawings, in which:

FIG. 1 is an end elevational view of a flanged pipe or fitting illustrating a tool constructed in accordance with the invention in operative position;

FIG. 2 is a top plan view of the tool on an enlarged scale;

FIG. 3 is a sectional view taken on the line 3—3 of FIG. 2;

FIG. 4 is a front elevational view of the tool illustrating the probes in retracted condition; and FIG. 5 is an end elevational view of the tool as viewed in the direction of the arrows 5—5 adjacent FIG. 4.

A tool constructed in accordance with the invention is adapted for use with a length of pipe or a fitting 1 having an annular flange 2 at one or both ends thereof, the flange having a plurality of openings 3 for the accommodation of bolts or the like (not shown). When the member 1 is to be joined to another pipe or the like, it is essential that the axes of the openings 3 be aligned with the openings in the flanges of other pipe lengths or fittings. To facilitate alignment of the openings an aligning tool conventionally is used in such manner as to assure a coplanar relationship of at least two of the openings.

An aligning tool constructed in accordance with the invention is designated generally by the reference character 4 and comprises an elongate, preferably metal body 5 having a pair of spaced apart slots 6 and 7 extending axially of the body and in prolongation of one another. Between the confronting ends of the slots 6 and 7 is a recess 8 in which is mounted a spirit level 9. The body has an upper portion 10 and a lower portion 11, the width of the lower portion being less than that of the upper portion so as to provide a shoulder 12 at each side of the body. The ends 13 of the upper portion 10 of the body are squared, whereas the ends 14 of the lower portion 11 of the body are formed on a radius.

The tool 4 also includes a pair of probes 15, each of which comprises an arm 16 terminating at one end in a finger 17 of generally trapezoidal configuration and which is of such size as to be accommodated in any one of the openings 3 of the flange 2. Between its ends each of the arms 16 is provided with a cavity 18 that is spanned by a transverse anchor pin 19 which anchors a jackspring 20 having a cantilever leg 21 which overlies the arm 16 and which constantly is biased to a raised position. The upper surface of each finger 17 has a groove 22 for the accommodation of the associated spring leg 21.

Each of the arms 16 is provided with a pair of upstanding generally triangular guides 23 and 24 terminating at one end in flat surfaces 25 and tapering toward the free ends of the fingers 17. The guides 23 and 24 extend above the upper surfaces of the arms 16, as is best shown in FIGS. 3 — 5, and are spaced apart a distance corresponding substantially to the width of the lower portion 11 of the body 5. The maximum height of the guides 23 and 24 corresponds substantially to the height of the lower body portion 11.

Means generally designated by the reference character 26 is provided for connecting the probes 15 to the body 5. The connecting means for each probe comprises a headed bolt 27 extending through the associated slot 6 or 7 and having a threaded shank 28 accommodated in a correspondingly threaded bore 29 formed in the probe arm 16. Each bolt shank also passes through a washer 30 which seats upon shoulders 31 formed in the respective slots 6 and 7. A spring 32 reacts between the washer 30 and the bolt head so as constantly to bias the associated probe 15 snugly against the base of the body 5.

The connecting means 26 not only serve to maintain the probes 15 in assembled relation with the body 5, but also enable the probes to be slid longitudinally of the body as is indicated by the arrows a in FIG. 2. The bolts 27 mount the probes 15 for rotation relatively to the body 5 as indicated by the arrow b in FIG. 2.

To condition the tool 4 for use, the probes 15 are arranged in the positions shown in full lines in FIG. 2 so that they parallel one another and extend substantially normal to the body 5. In these positions of the probes, the flat, rear surfaces 25 of the guides 23 and 24 abut the confronting surface of the lower body portion 11 so as to maintain the arms 16 coplanar and parallel to one another. The springs 32 maintain the rear ends of the arms 16 snugly against the lower surface of the body 5, but the resilience of the springs enables the probes 15 to be slid toward and away from one another so as to enable the fingers 17 to be aligned with any pair of flange openings 3. To insert the fingers 17 in a pair of flange openings, the spring legs 21 may be depressed manually so as to permit the legs to be introduced to the openings 3 with the fingers 17. If the openings 3 are quite small, but large enough to receive the fingers 17, the spring legs 21 may be received in the grooves 22 so as not to prevent passage of the fingers into the openings. The spring legs will react with the walls of the openings and effect seating of the fingers in their respective openings, as is indicated in chain lines in FIG. 3. The pipe or fitting 1 then may be rotated until such time as the spirit level 9 indicates that the openings in which the fingers 17 are received are coplanar..

Following adjustment of the member 1, the fingers 17 may be withdrawn from the openings 3 and slid away from one another longitudinally of the body 5 until such time as the bolts 27 reach the extreme ends of the slots 6 and 7. The slots 6 and 7 are of such length that, when the bolts 27 are at extreme ends thereof, the probes 15 may be rotated relatively to the body so that the arms 16 parallel the body and extend in prolongation thereof. Such rotation of the probes is permitted because of the curvature of the ends of the lower body portion 11. Following such rotation of the probes, they may be slid toward one another to the retracted positions as shown in FIG. 4. The probes will be retained in their retracted positions by the guides 23 and 24 which, in these positions of the probes, straddle the body.

As the probes are slid toward their retracted positions, the spring legs 21 will engage the lower surface of the body 5 and be deflected toward the fingers 17. Preferably, the opposite ends of the body 5 are slotted vertically, as at 33, thereby providing a space for the accommodation of the spring legs 21 when the probes are in their retracted positions. The springs thus are not subjected to prolonged periods of unnecessary stress when the probes are retracted.

The disclosed embodiment is representative of a presently preferred form of the invention, but is intended to be illustrative rather than definitive thereof. The invention is defined in the claims.

I claim:

1. A tool for use in aligning a flanged pipe or the like having at least a pair of openings in its flange, said tool comprising an elongate body having opposite terminal ends; a pair of probes each of which terminates at one end in a finger of such size as to be accommodated in an opening of such flange; means mounting each of said probes on said body for rotary movements relative thereto and for sliding movements toward and away from a terminal end of said body; and guide means on each of said probes engaging said body except when said probes are at the terminal ends of said body for maintaining said probes selectively in a first position in which said probes extend substantially parallel to said body or in a second position in which said probes substantially parallel each other and extend substantially normal to said body, the engagement of said guide means with said body preventing rotary movement of said probes from either of said positions to the other except when said probes are at the terminal ends of said body.

2. A tool according to claim 1 wherein said body has a slot extending longitudinally thereof and wherein said mounting means includes a member carried by each of said probes and accommodated in said slot.

3. A tool according to claim 2 including spring means reacting between said member and the associated probe and constantly biasing the latter toward engagement with said body.

4. A tool according to claim 1 including a resilient member carried by each of said probes and having a free end movable toward and away from the associated finger.

5. A tool according to claim 3 wherein each of said fingers has a groove therein for the accommodation of the associated resilient member.

6. A tool according to claim 1 including a spirit level carried by said body.

7. A tool for use in aligning a flanged pipr or the like having at least a pair of openings in its flange, said tool comprising an elongate body having a slot therein extending longitudinally of said body; a pair of probes each of which terminates at one end in a finger of such size as to be accommodated in an opening of said flange; connecting means extending through said slot and connected to said probes, whereby each of said probes is slideable longitudinally of said body and is rotatable relatively to said body from a first position in which said probes extend substantially normal to said body to a second position in which said probes extend substantially parallel to said body; and a pair of spaced apart guide members carried by each of said probes and adapted in said first position of said probes to abut said body and in the second position of said probes to straddle said body.

8. A tool according to claim 7 including a contilever spring carried by each of said probes, each of said springs having a free end adjacent its associated finger.

9. A tool according to claim 8 wherein each of said fingers has a slot therein for the accommodation of said free end of its associated spring.

10. A tool according to claim 7 including spring means acting between each of said probes and said body and forming part of said connecting means.

11. A tool according to claim 7 wherein said body has first and second parts, said first part having a greater width than that of said second part and said second part having free ends formed on a radius.

* * * * *